(12) United States Patent
Song et al.

(10) Patent No.: US 12,683,142 B2
(45) Date of Patent: Jul. 14, 2026

(54) ELECTRODE THICKNESS CONTROL METHOD AND CONTROL SYSTEM

(71) Applicants: HUIZHOU EVE POWER CO., LTD, Huizhou (CN); EVE POWER CO., LTD., Jingmen (CN)

(72) Inventors: Shuaishuai Song, Jingmen (CN); Liquan Chen, Jingmen (CN); Ke Gui, Jingmen (CN); Wei He, Jingmen (CN)

(73) Assignees: HUIZHOU EVE POWER CO., LTD., Huizhou (CN); EVE POWER CO., LTD., Jingmen (CN)

( * ) Notice: Subject to any disclaimer, the term of this patent is extended or adjusted under 35 U.S.C. 154(b) by 433 days.

(21) Appl. No.: 18/459,687

(22) Filed: Sep. 1, 2023

(65) Prior Publication Data

US 2023/0411589 A1      Dec. 21, 2023

(30) Foreign Application Priority Data

Apr. 6, 2023     (CN) .......................... 202310359907.6

(51) Int. Cl.
*B21B 37/16*          (2006.01)
*H01M 4/04*          (2006.01)
*H01M 4/139*          (2010.01)

(52) U.S. Cl.
CPC ........... *H01M 4/0435* (2013.01); *B21B 37/16* (2013.01); *H01M 4/139* (2013.01); *H01M 4/04* (2013.01); *Y02E 60/10* (2013.01)

(58) Field of Classification Search
USPC ........................................................ 700/148
See application file for complete search history.

(56) References Cited

U.S. PATENT DOCUMENTS

2017/0256781 A1* 9/2017 Suzuki ................. H01M 4/139
2021/0394246 A1* 12/2021 Terasawa ............ B30B 15/0094
(Continued)

FOREIGN PATENT DOCUMENTS

CN          101758085 A        6/2010
CN          104393229 A        3/2015
(Continued)

OTHER PUBLICATIONS

Chinese Office Action issued in corresponding Chinese Patent Application No. 202310359907.6 dated May 7, 2023, pp. 1-10.
(Continued)

*Primary Examiner* — Emilio J Saavedra
(74) *Attorney, Agent, or Firm* — PV IP PC; Wei Te Chung; Christopher S. Ruprecht

(57)          ABSTRACT

An electrode thickness control method and a control system is provided. The control method includes: obtaining an initial thickness and a target thickness of a to-be-rolled electrode; controlling, according to the initial thickness and the target thickness, a target device to roll the to-be-rolled electrode; obtaining first thickness change data of the to-be-rolled electrode, second thickness change data of a rolled electrode formed through rolling, and current rolling speed data of the target device; and adjusting, according to the first thickness change data, the second thickness change data, or the current rolling speed data, a current rolling pressure or a current rolling temperature of the target device, to cause a thickness of the rolled electrode to reach the target thickness.

12 Claims, 4 Drawing Sheets

(56) References Cited

U.S. PATENT DOCUMENTS

| | | | | |
|---|---|---|---|---|
| 2022/0140309 A1* | 5/2022 | Hu | .................... | H01M 10/0587 |
| | | | | 29/623.1 |
| 2023/0033169 A1* | 2/2023 | Terasawa | .................. | B30B 3/00 |
| 2023/0163268 A1* | 5/2023 | Yushin | ................ | H01M 4/0404 |
| | | | | 429/231.95 |
| 2023/0207821 A1* | 6/2023 | Yamada | ................ | H01M 4/139 |
| | | | | 429/231.95 |

FOREIGN PATENT DOCUMENTS

| | | | | | |
|---|---|---|---|---|---|
| CN | 104681775 | A | 6/2015 | | |
| CN | 111822517 | A | 10/2020 | | |
| CN | 111872119 | A | 11/2020 | | |
| CN | 112912185 | A | 6/2021 | | |
| CN | 114054513 | A | 2/2022 | | |
| CN | 114442680 | A | 5/2022 | | |
| CN | 114566716 | A | 5/2022 | | |
| CN | 114929463 | A | 8/2022 | | |
| CN | 116060453 | A | 5/2023 | | |
| JP | 2014122702 | A | 7/2014 | | |
| JP | 2015230825 | A | 12/2015 | | |
| JP | 2020030930 | A | 2/2020 | | |
| TW | 202013789 | A | * 4/2020 | ............ | H10K 71/00 |

OTHER PUBLICATIONS

International Search Report in International application No. PCT/CN2023/103630, mailed on Dec. 16, 2023.
Written Opinion of the International Search Authority in International application No. PCT/CN2023/103630, mailed on Dec. 16, 2023.

* cited by examiner

First direction

To-be-rolled electrode                    Rolled electrode

1

Control apparatus

Data

Memory 100                    200

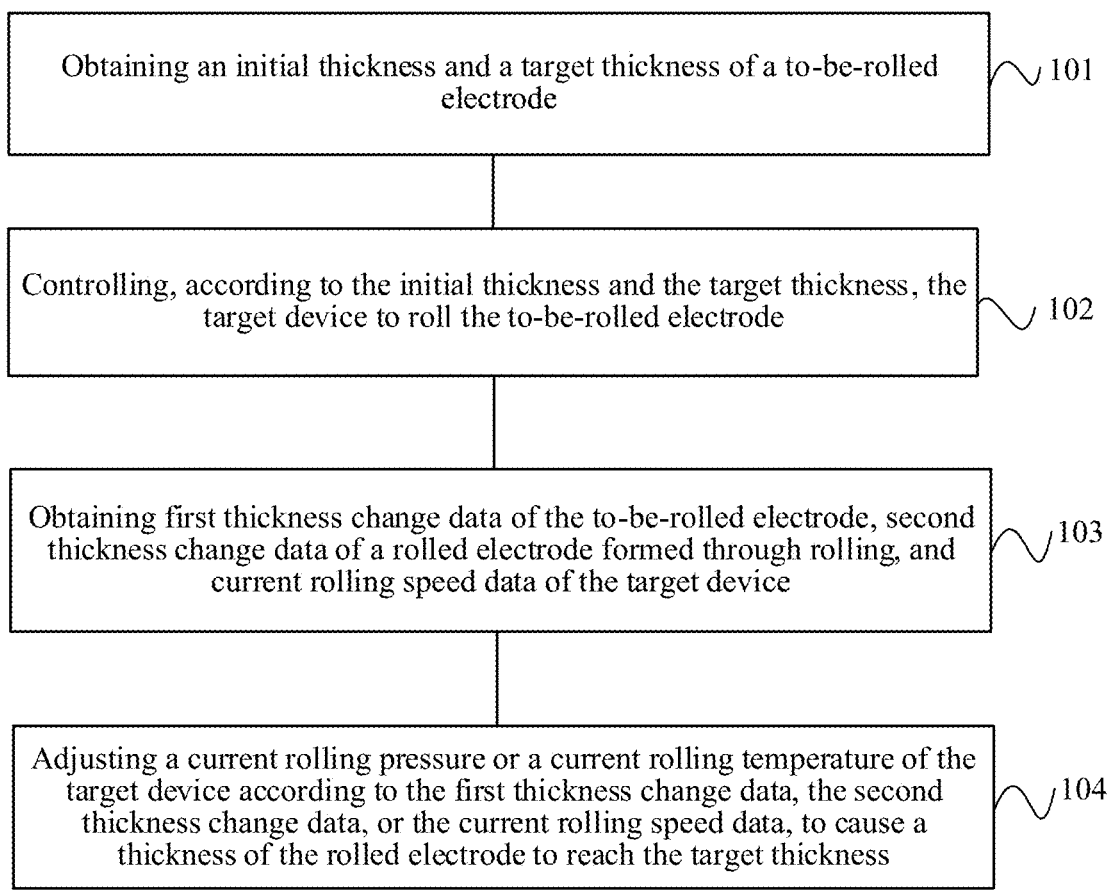

Obtaining an initial thickness and a target thickness of a to-be-rolled electrode ⌐⌐ 101

Controlling, according to the initial thickness and the target thickness, the target device to roll the to-be-rolled electrode ⌐⌐ 102

Obtaining first thickness change data of the to-be-rolled electrode, second thickness change data of a rolled electrode formed through rolling, and current rolling speed data of the target device ⌐⌐ 103

Adjusting a current rolling pressure or a current rolling temperature of the target device according to the first thickness change data, the second thickness change data, or the current rolling speed data, to cause a thickness of the rolled electrode to reach the target thickness ⌐⌐ 104

FIG. 3

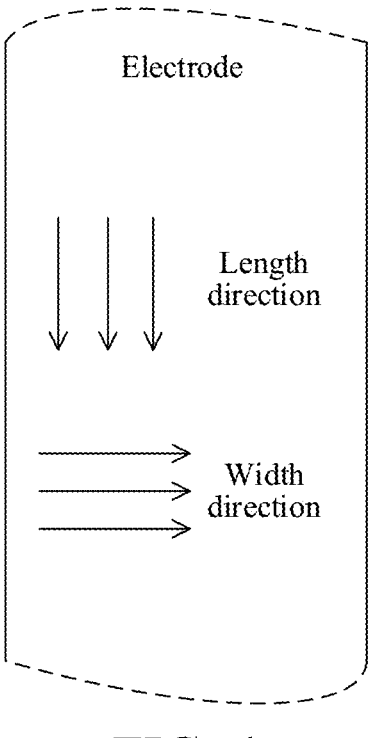

Electrode

Length direction

Width direction

FIG. 4

ELECTRODE THICKNESS CONTROL METHOD AND CONTROL SYSTEM

CROSS-REFERENCE TO RELATED APPLICATION

The present disclosure claims the priority to Chinese Application No. 202310359907.6, filed on Apr. 6, 2023, the contents of which are incorporated herein by reference in their entirety.

FIELD

The present disclosure generally relates to the field of battery technology, and in particular, to an electrode thickness control method and a control system.

BACKGROUND

In a process of producing an electrode of a lithium-ion battery, a procedure of rolling the electrode is involved. The rolled electrode is stretched and compressed, thereby ensuring that the produced electrode has a proper compression density, and further ensuring quality of the produced battery.

Currently, based on a rapid development of lithium battery technology, an increasingly high requirement for thickness consistency of an electrode of a battery is put forward. However, a conventional rolling device controls a rolling thickness of an electrode by using a constant rolling pressure or a constant rolling gap. As a result, thickness consistency of the produced electrode is likely to be poor.

SUMMARY

According to the present disclosure, an electrode thickness control method includes obtaining an initial thickness and a target thickness of a to-be-rolled electrode; controlling, according to the initial thickness and the target thickness, a target device to roll the to-be-rolled electrode; obtaining first thickness change data of the to-be-rolled electrode, second thickness change data of a rolled electrode formed through rolling, and current rolling speed data of the target device; and adjusting a current rolling pressure or a current rolling temperature of the target device according to the first thickness change data, the second thickness change data, or the current rolling speed data, to cause a thickness of the rolled electrode to reach the target thickness.

According to the present disclosure, a control system includes a target device electrically connected to the target device; and a control apparatus configured to execute the method according to the present disclosure.

DESCRIPTION OF DRAWINGS

FIG. 3 is a schematic flowchart according to some embodiments of an electrode thickness control method according to some embodiments of the present disclosure.

FIG. 4 is a schematic diagram of a structure according to some embodiments of an electrode according to some embodiments of the present disclosure.

DETAILED DESCRIPTION

In the description of the present disclosure, it should be understood that, orientations or position relationships indicated by terms such as "center", "longitudinal", "transverse", "length", "width", "thickness", "up", "down", "front", "back", "left", "right", "vertical", "horizontal", "top", "bottom", "in", and "out" are orientations or position relationship shown based on the accompanying drawings, and are merely used for describing the present disclosure and simplifying the description, rather than indicating or implying that the apparatus or element must have a particular orientation or be constructed and operated in a particular orientation, and therefore, should not be understood as a limitation on the present disclosure. In addition, terms "first" and "second" are used only for descriptive purposes, and shall not be understood as indicating or implying relative importance or implying a quantity of indicated technical features. Therefore, a feature restricted by "first" or "second" may explicitly or implicitly include one or more such features. In the description of the present disclosure, "multiple" means two or more, unless otherwise particularly defined.

In the present disclosure, the word "illustrative" is used to represent "giving an example, an illustration, or a description". Any embodiment described as "illustrative" in the present disclosure may not necessarily be explained as being more preferred or having more advantages than another embodiment. The following descriptions are presented in order to enable any person skilled in the art to implement and use the present disclosure. In the following description, details are listed for the purpose of explanation. It should be understood that a person of ordinary skilled in the art can realize that the present disclosure can also be implemented when these particular details are not used. In other examples, commonly known structures and processes are not described in detail, to prevent unnecessary details from making descriptions of the present disclosure obscure. Therefore, the present disclosure is not intended to limit the embodiments shown, but to be consistent with the widest scope conforming to the principles and features according to the present disclosure.

Figures 1, 2:
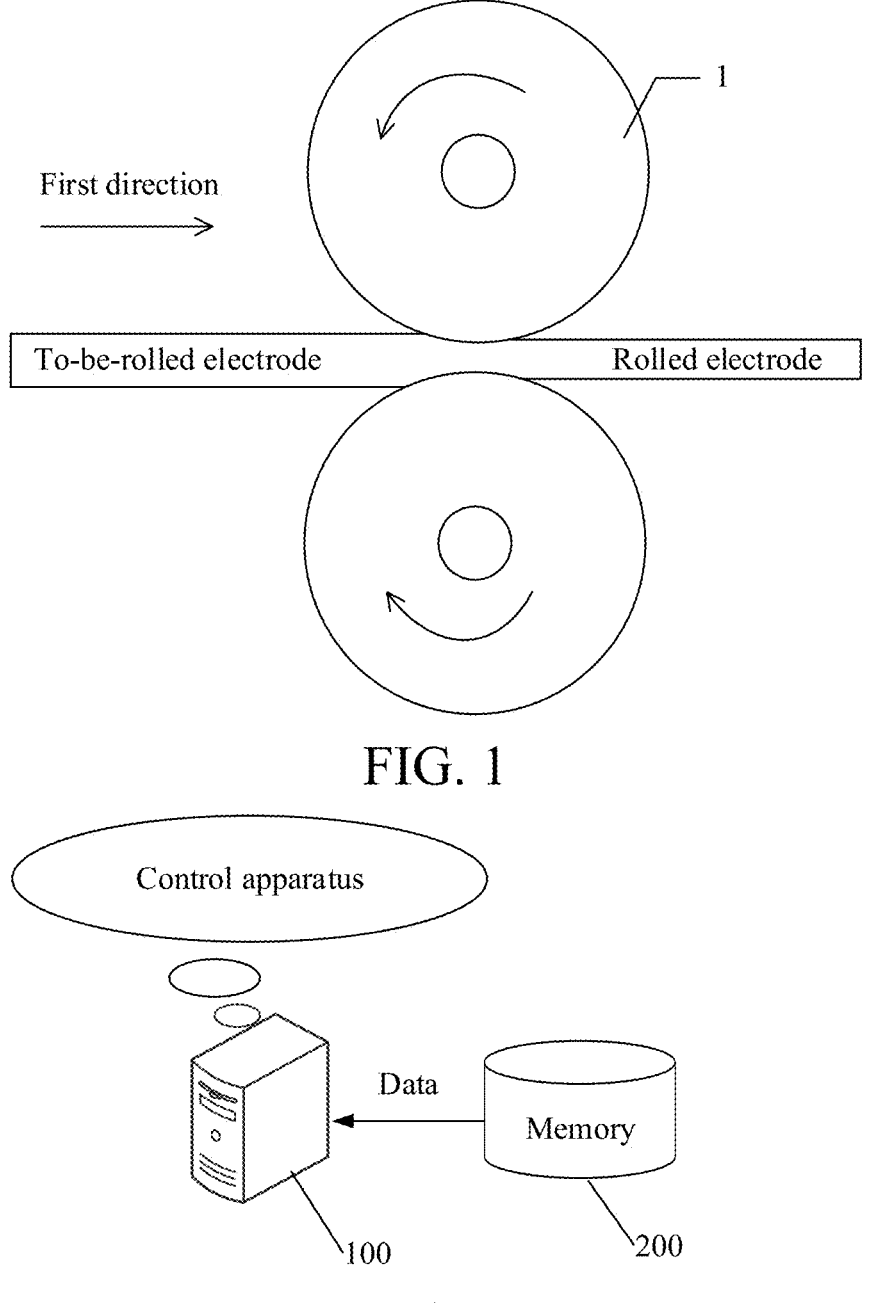
FIG. 1 is a schematic diagram of a scenario of a rolling device in existing art.
FIG. 2 is a schematic diagram of a scenario of an electrode thickness control system according to some embodiments of the present disclosure.

In industrial production, an electrode of a lithium battery is generally continuously rolled and compressed using a rolling device (twin rollers). As shown in FIG. 1, the rolling device includes two rollers 1. In this process, a to-be-rolled battery electrode with particle coating on both sides is fed into a gap between the two rollers 1. Under the load of the two rollers 1, the coating of the to-be-rolled battery electrode is compressed and controlled to a required thickness. A rolled electrode is formed after getting out of the gap between the two rollers 1. However, currently, some rolling device controls a rolling thickness of an electrode by using a constant rolling pressure or a constant rolling gap, which easily causes poor consistency in the thickness of the produced electrode.

To resolve the foregoing problem, according to embodiments of the present disclosure, it is provided an electrode thickness control method and a control system. Detailed descriptions are provided below separately.

FIG. 2 is a schematic diagram of a scenario of an electrode thickness control system according to an embodiment of the present disclosure. The electrode thickness control system may include an electronic device 100 configured to complete an electrode thickness control method. A control apparatus is integrated in the electronic device 100.

Additionally, as shown in FIG. 2, the electrode thickness control system may further include a memory 200 configured to store data, such as, pressure data, speed data, temperature data, and the like of a roller.

It needs to be noted that, the schematic diagram of the scenario of the electrode thickness control system shown in FIG. 2 is merely an example. The electrode thickness control system and the scenario described in the embodiments of the present disclosure are intended to more clearly describe the technical solutions according to the embodiments of the present disclosure, and do not constitute a limitation on the technical solutions according to the embodiments of the present disclosure. A person of ordinary skilled in the art may learn that, with evolution of the electrode thickness control system and appearance of a new service scenario, the technical solutions according to the embodiments of the present disclosure are also applicable to similar technical problems.

The electrode thickness control method according to the embodiments of the present disclosure is described below. In the embodiments of the present disclosure, an electronic device is used as an executing entity. For simplification and convenience of descriptions, the executing entity is omitted in a subsequent method embodiment. The electrode thickness control method includes obtaining an initial thickness and a target thickness of a to-be-rolled electrode; controlling, according to the initial thickness and the target thickness, a target device to roll the to-be-rolled electrode; obtaining first thickness change data of the to-be-rolled electrode, second thickness change data of a rolled electrode formed through rolling, and current rolling speed data of the target device; and adjusting a current rolling pressure or a current rolling temperature of the target device according to the first thickness change data, the second thickness change data, or the current rolling speed data, to cause a thickness of the rolled electrode to reach the target thickness.

In the present disclosure, by the rolling control method, a thickness status of the to-be-rolled electrode, a rolling status of the rolled electrode, and a current rolling speed, a current rolling pressure, and a current rolling temperature of the target device can be obtained in real time, and the current rolling pressure or the current rolling temperature can be adjusted in real time according to the data obtained in the rolling process. So that a thickness of the rolled electrode reaches the target thickness, making it convenient to continuously keep the thickness of the rolled electrode obtained through rolling uniform.

According to the present disclosure, an electrode thickness control method is applied in a control system. The control system includes a target device configured to roll a to-be-rolled electrode. FIG. 3 is a schematic flowchart of an embodiment of an electrode thickness control method according to an embodiment of the present disclosure. It should be noted that, although a logic order is shown in the flowchart, in some cases, the shown or described steps may be performed in an order different from the order herein. The electrode thickness control method includes steps 101, 102, 103, and 104.

Step 101 includes obtaining an initial thickness and a target thickness of a to-be-rolled electrode.

As shown in FIG. 1, the to-be-rolled electrode is an electrode to be input to a target device (two rollers 1) for rolling. Correspondingly, a rolled electrode is an electrode that is output by the target device (the two rollers 1) and that is completely rolled.

An initial thickness of the to-be-rolled electrode is an actual thickness before rolling, and may be understood as an incoming thickness of the to-be-rolled electrode. In the present embodiment, there may be the following several manners of obtaining the initial thickness of the to-be-rolled electrode.

(1) A thickness detection device arranged in a control system is used to detect the to-be-rolled electrode in real time, and transmit the detected initial thickness to an executing entity executing the electrode thickness control method (hereinafter referred to as a control method). The thickness detection device (a thickness detection device mentioned below is similar) may be any one of or a combination of at least two of a laser thickness tester, an ultrasonic tester, an infrared tester, and the like. Another thickness detection device that can implement a thickness detection may be used. This is not particularly limited in an embodiment of the present disclosure.

(2) An initial thickness of the to-be-rolled electrode is tested, and the initial thickness of the to-be-rolled electrode is uploaded to an executing entity for executing a control method. Manners of obtaining the initial thickness of the to-be-rolled electrode are not specifically limited in an embodiment.

The target thickness of the to-be-rolled electrode is a final thickness that the to-be-rolled electrode needs to reach by rolling. The target thickness may be a thickness that is set according to experience. This is not specifically limited in an embodiment.

Step 102 includes controlling, according to the initial thickness and the target thickness, the target device to roll the to-be-rolled electrode.

After receiving the initial thickness and the target thickness, the executing entity for executing the control method analyzes the initial thickness and the target thickness, initially calculates an initial rolling pressure and an initial rolling temperature of the target device, and controls the target device to roll the to-be-rolled electrode at the initial rolling pressure and the initial rolling temperature. In an embodiment, the initial rolling pressure and the initial rolling temperature are data at which the executing entity for executing the control method can roll the to-be-rolled electrode with the initial thickness into the rolled electrode with the target thickness.

Step 103 includes obtaining first thickness change data of the to-be-rolled electrode, second thickness change data of a rolled electrode formed through rolling, and current rolling speed data of the target device.

When the executing entity for executing the control method controls the target device to roll the to-be-rolled electrode, a thickness detection device arranged at a feeding end and a discharging end of the target device detects the thickness of the to-be-rolled electrode and the thickness of the rolled electrode in real time, and transmits detected first thickness data and second thickness data to the executing entity for executing the control method.

In the present embodiment, the first thickness change data is a thickness jump value of the to-be-rolled electrode generated due to various factors at two consecutive moments. Similarly, the second thickness change data is a thickness jump value of the rolled electrode generated due to various factors at two moments. The thickness jump value includes an increased thickness value of a thickness increase or a decreased thickness value of a thickness decrease. The current rolling speed data of the target device is a current rolling speed of the target device at a current moment.

Particularly, the executing entity for executing the control method calculates a first thickness change data of the to-be-rolled electrode according to a difference between the initial thickness of the to-be-rolled electrode and the first thickness data. For example, when the initial thickness of the to-be-rolled electrode detected at a previous moment of the current moment is 6 micrometers, and the first thickness data of the to-be-rolled electrode detected at the current moment is 8 micrometers, the calculated first thickness change data of the to-be-rolled electrode is that the thickness of the to-be-rolled electrode increases by 2 micrometers.

In the present embodiment, the executing entity for executing the control method further calculates the second thickness change data of the rolled electrode according to a difference between the current thickness of the rolled electrode and the target thickness. For example, when the thickness of the rolled electrode detected at a previous moment of the current moment is the target thickness, the target thickness is 4 micrometers, and the second thickness data of the rolled electrode detected at the current moment is 5 micrometers, the calculated second thickness change data of the rolled electrode is that the thickness of the rolled electrode increases by 1 micrometer.

Step 104 includes adjusting a current rolling pressure or a current rolling temperature of the target device according to the first thickness change data, the second thickness change data, or the current rolling speed data, to cause the thickness of the rolled electrode to reach the target thickness.

In some embodiments of the present disclosure, the adjusting the current rolling pressure or the current rolling temperature of the target device according to the first thickness change data, the second thickness change data, or the current rolling speed data particularly includes adjusting the current rolling pressure of the target device according to the first thickness change data and a preset first pressure adjustment policy.

Particularly, the first pressure adjustment policy includes: each time a thickness of the to-be-rolled electrode increases by one first target thickness value, the current rolling pressure of the target device is controlled to correspondingly increase by one first target pressure value; or each time a thickness of the to-be-rolled electrode decreases by one first target thickness value, the current rolling pressure of the target device is controlled to correspondingly decrease by one first target pressure value.

In the present disclosure, the foregoing manner of adjusting the current rolling pressure or the current rolling temperature may be a direct adjustment. Alternatively, the first target pressure value may be calculated according to the obtained first thickness change data by the first calculation formula loaded to the executing entity for executing the control method, and then the target device may be adjusted automatically according to the first target pressure value by the executing entity for executing the control method.

That is, in an embodiment, before the adjusting the current rolling pressure of the target device according to the first thickness change data and the preset first pressure adjustment policy, the method further includes inputting the first target thickness value to a preset first calculation formula to perform calculation, and outputting the first target pressure value by the first calculation formula.

Particularly, the first calculation formula includes $Fc1 \propto Tc1$. $Fc1$ is the first target pressure value, and $Tc1$ is the first target thickness value. That is, the first target thickness value is proportional to the first target pressure value. For example, the first target thickness value is 1 micrometer, and the first target pressure value is any value ranging from 0.1-5 tons.

An example is given to describe an embodiment. For example, the first target thickness value by which the thickness of the to-be-rolled electrode increases is 1 micrometer. 1 micrometer is input to the first calculation formula for calculation, and the first target pressure value outputted by the first calculation formula is (+3) tons, then the executing entity for executing the control method correspondingly controls the current rolling pressure of the target device to increase by 3 tons. Alternatively, for example, the first target thickness value by which the thickness of the to-be-rolled electrode decreases is 1 micrometer. 1 micrometer is input to the first calculation formula for calculation, and the first target pressure value outputted by the first calculation formula is (−3) tons, then the executing entity for executing the control method correspondingly controls the current rolling pressure of the target device to decrease by 3 tons.

In an actual application process, the executing entity for executing the control method adaptively adjusts the current rolling pressure of the target device according to actually monitored first thickness change data of the to-be-rolled electrode. Using an example in which the executing entity for executing the control method is a Programmable Logic Controller (PLC) and a Manufacturing Execution System (MVES) and the to-be-rolled electrode is rolled by rollers driven by a cylinder, both the PLC and the MES are communicatively connected to the cylinder and a thickness detection device configured to monitor the first thickness change data of the to-be-rolled electrode. In an application process, the thickness detection device continuously monitors the first thickness change data of the to-be-rolled electrode and transmits the first thickness change data of the to-be-rolled electrode to the IVIS, the IVIS calculates, according to first thickness change data of each 100 to-be-rolled electrodes, a thickness change median of the to-be-rolled electrodes, and the PLC and the IVIS adjust a current rolling pressure of the cylinder according to the thickness change median of the to-be-rolled electrodes. The parameter adjustment of the current rolling pressure of the target device and the thickness of the to-be-rolled electrode ma refer to Table 1.

TABLE 1

| | MES thickness monitoring (100 data points) | Pressure adjustment instruction (tons) |
|---|---|---|
| Drive side | >median + 0.5 micrometers | +1.2 |
| | >median + 1.0 micrometer | +2.7 |
| | <median + 0.5 micrometers | −1.2 |
| | <median + 1.0 micrometer | −2.7 |
| Operation side | >median + 0.5 micrometers | +1.2 |
| | >median + 1.0 micrometer | +2.7 |
| | <median + 0.5 micrometers | −1.2 |
| | <median + 1.0 micrometer | −2.7 |

In Table 1, the IVIS thickness monitoring (100 data points) indicates the thickness change median of the to-be-rolled electrode calculated by the MES according to first thickness change data of each 100 to-be-rolled electrodes, the pressure adjustment instruction indicates a control instruction given by the PLC and the MES, and the pressure adjustment instruction is used for controlling to adjust the current rolling pressure of the target device according to a corresponding pressure value.

The following explains some data in Table 1. When the MES calculates, according to first thickness change data of each 100 to-be-rolled electrodes, the thickness change median of the to-be-rolled electrodes that is greater than 0.5 micrometer, correspondingly, the pressure adjustment instruction given by the PLC and the MES is "+1.2 (tons)", and the current rolling pressure of the cylinder is controlled correspondingly according to the pressure adjustment instruction of "+1.2 (tons)" to increase by 1.2 (tons).

Only an example is described herein. Because different device types are different, different parameters may be actually set according to the different device types, and the first target thickness value and the first target pressure value are not specifically limited in an embodiment. A manner of obtaining the first calculation formula is specifically described below in the present disclosure, which is not stated herein.

In some embodiments of the present disclosure, the second thickness change data includes length and thickness change data of the rolled electrode in a first direction. As shown in FIG. 1, the first direction is a direction in which the rolled electrode is transferred in the target device. Particularly, the length and thickness change data is data of a change of the thickness of the rolled electrode in a length direction shown in FIG. 4.

The adjusting a current rolling pressure or a current rolling temperature of the target device according to the first thickness change data, the second thickness change data, or the current rolling speed data specifically includes adjusting the current rolling pressure of the target device according to the length and thickness change data and a preset second pressure adjustment policy.

Particularly, the second pressure adjustment policy includes: each time the thickness of the rolled electrode increases by one second target thickness value in the first direction, the current rolling pressure of the target device is controlled to correspondingly increase by one second target pressure value; or each time the thickness of the rolled electrode decreases by one second target thickness value in the first direction, the current rolling pressure of the target device is controlled to correspondingly decrease by one second target pressure value.

In the present disclosure, the foregoing manner of adjusting a current rolling pressure or a current rolling temperature may be a direct adjustment. Alternatively, the second target pressure value may be calculated according to the obtained length and thickness change data by the second calculation formula loaded to the executing entity for executing the control method, and then the target device may be adjusted automatically according to the second target pressure value by the executing entity for executing the control method.

That is, in an embodiment, before the adjusting the current rolling pressure of the target device according to the length and thickness change data and the preset second pressure adjustment policy, the method further includes inputting the second target thickness value to the preset second calculation formula to perform calculation, and outputting the second target pressure value by the second calculation formula.

Particularly, the second calculation formula includes $Fc2 \propto Tc2$, in which $Fc2$ is the second target pressure value, and $Tc2$ is the second target thickness value. That is, the second target thickness value is proportional to the second target pressure value. For example, the second target thickness value is set to 0.5 micrometer, and the second target pressure value is set to any value ranging from 0.1 to 5 tons.

The present embodiment is described with an example. For example, when the second target thickness value by which the thickness of the rolled electrode increases is 0.5 micrometer, 0.5 micrometer is input to the second calculation formula for calculation, and the second target pressure value outputted by the second calculation formula is (+3) tons, the executing entity for executing the control method correspondingly controls the current rolling pressure of the target device to increase by 3 tons. Alternatively, for example, when the second target thickness value by which the thickness of the rolled electrode decreases is 0.5 micrometer, 0.5 micrometer is input to the second calculation formula for calculation, and the second target pressure value outputted by the second calculation formula is (−3) tons, the executing entity for executing the control method correspondingly controls the current rolling pressure of the target device to decrease by 3 tons. Only an example is described herein. Because different device types are different, different parameters may be actually set according to the different device types, and the second target thickness value and the second target pressure value are not specifically limited in an embodiment. A manner of obtaining the second calculation formula is specifically described below in the present disclosure, which is not stated herein.

Figure 6:
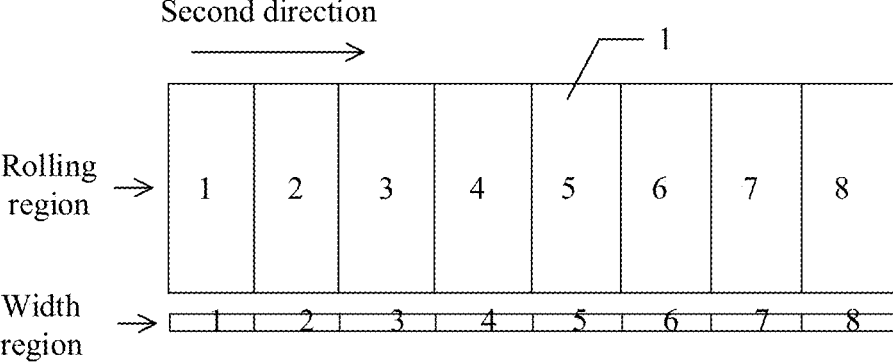
FIG. 6 is a schematic diagram of a structure according to some embodiments of a target device according to some embodiments of the present disclosure.

In some embodiments of the present disclosure, as shown in FIG. 6, the target device includes a roller, the roller includes multiple rolling regions arranged sequentially in a second direction. Current rolling temperatures corresponding to each of the rolling regions are all independently controlled. The second direction is an axial direction of the roller.

the rolled electrode includes multiple width regions arranged sequentially in the second direction. In a process of transferring the rolled electrode, one of the width regions corresponds to one of the rolling regions. The second thickness change data includes multiple pieces of width and thickness change data corresponding to multiple width regions. Particularly, the width and thickness change data is change data of the thickness of the rolled electrode in a width direction shown in FIG. 4.

In an embodiment, illustratively, it may be set that, the roller includes 8 rolling regions arranged sequentially in the second direction, and the rolled electrode includes 8 width regions arranged sequentially in the second direction. In a process of transferring the rolled electrode, each width region corresponds to one rolling region. In an embodiment, the quantity of the rolling region of the roller and the quantity of the width region of the rolled electrode also may be set to other quantities according to different types of devices, which is not specifically limited in an embodiment.

The adjusting the current rolling pressure or the current rolling temperature of the target device according to the first thickness change data, the second thickness change data, or the current rolling speed data includes adjusting the current rolling temperature of the multiple rolling regions of each roller according to the multiple pieces of width and thickness change data and the preset temperature adjustment policy.

Particularly, the temperature adjustment includes: each time a thickness of the width region of the rolled electrode increases by one third target thickness value, the current rolling temperature of the rolling region of the two rollers corresponding to the width region is controlled to correspondingly increase by one target temperature value; or each time a thickness of the width region of the rolled electrode decreases by one third target thickness value, the current rolling temperature of the rolling region of the two rollers corresponding to the width region is controlled to correspondingly decrease by one target temperature value.

In the present disclosure, the foregoing manner of adjusting a current rolling pressure or a current rolling temperature may be a direct adjustment. Alternatively, the target temperature value may be calculated according to the obtained multiple pieces of width and thickness change data by the third calculation formula loaded to the executing entity for executing the control method, and then the rollers may be adjusted automatically according to the target temperature value by the executing entity for executing the control method.

That is, in an embodiment, before the adjusting the current rolling temperature of the plurality of rolling regions of each of the rollers according to the multiple pieces of width and thickness change data and a preset temperature adjustment policy, the method further includes inputting a third target thickness value to a preset third calculation formula to perform calculation, and outputting the target temperature value by the third calculation formula.

Particularly, the third calculation formula includes $Temp_c \propto Tc3$. $Temp_c$ is the target temperature value, and $Tc3$ is the third target thickness value. That is, the third target thickness value is proportional to the target temperature value. Illustratively, the third target thickness value is set to 0.5 micrometer, and the target temperature value is set to any value ranging from 0.1-5 degrees Celsius.

An embodiment is described with an example. For example, when the third target thickness value by which a thickness of a width region marked as 3 of the rolled electrode increases is 0.5 micrometer, 1 micrometer is input to the third calculation formula for calculation, and the target temperature value outputted by the third calculation formula is (+3) degrees Celsius, then the executing entity for executing the control method correspondingly controls the current rolling temperature of the rolling region marked as 3 of two rollers to increase by 3 degrees Celsius. Alternatively, for example, when the third target thickness value by which the thickness of the width region marked as 3 of the rolled electrode decreases is 0.5 micrometer, 1 micrometer is input to the third calculation formula for calculation, and the target temperature value outputted by the third calculation formula is (−3) degrees Celsius, then the executing entity for executing the control method correspondingly controls the current rolling temperature of rolling region marked as 3 of two rollers to decrease by 3 degrees Celsius. Only an example is described herein. Because different device types are different, different parameters may be actually set according to different device types, and the third target thickness value and the target temperature value are not specifically limited in an embodiment. A manner of obtaining the third calculation formula is specifically described below in the present disclosure, which is not stated herein.

Figure 5:
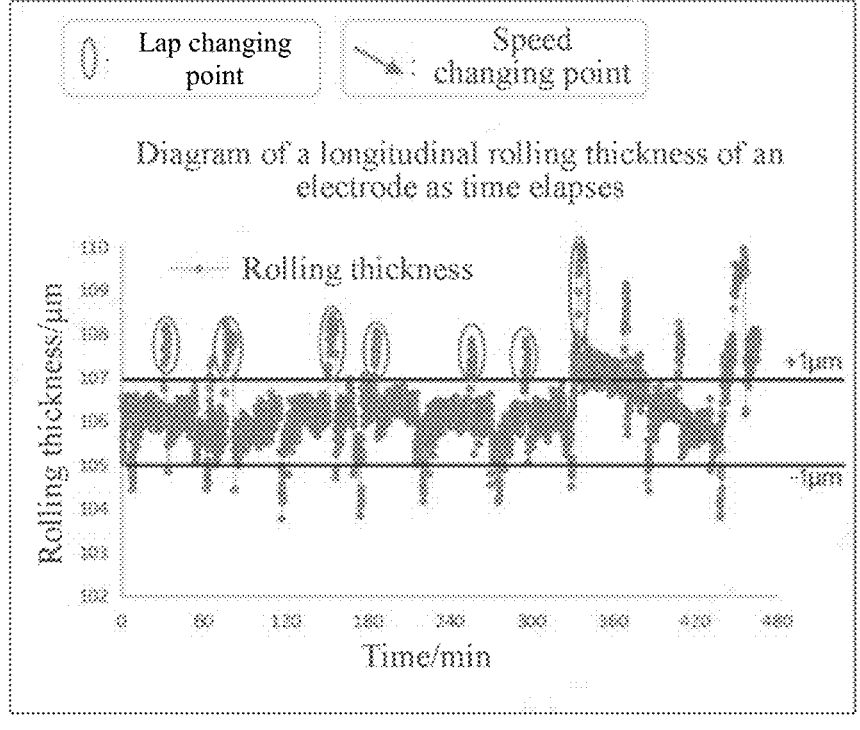
FIG. 5 is a schematic diagram of a longitudinal rolling thickness of an electrode as time elapses according to some embodiments of the present disclosure.

In some embodiments of the present disclosure, because the rolling speed of the target device, specifically the rolling speed of the two rollers, changes due to external factors, the change of the rolling speed of the two rollers affects a rolling effect of the to-be-rolled electrode, ultimately causing great difference in the thickness of the rolled electrode. The external factor such as electrode lap changing, roller start-stop, and a difference between rolling speeds of two rollers causes the rolling speeds of the two rollers to change. Illustratively, as shown in FIG. 5, a thickness of the rolled electrode in a longitudinal direction (a length direction of the electrode) continuously changes particularly at a lap changing point (the lap changing point refers to a time point at which a lap changing is performed on the electrode) as time elapses. Because the rolling speed of the roller changes during the lap changing, the thickness of the rolled electrode at the lap changing point also changes unusually significantly.

Therefore, in an embodiment of the present disclosure, the adjusting the current rolling pressure or the current rolling temperature of the target device according to the first thickness change data, the second thickness change data, or the current rolling speed data further specifically includes: adjusting the current rolling pressure of the target device according to the current rolling speed data and a preset third pressure adjustment policy.

Particularly, the third pressure adjustment policy includes: each time the current rolling speed of the target device is greater than a preset rolling speed threshold by one target speed value, the current rolling pressure of the target device is controlled to correspondingly decrease by one third target pressure value; or each time the current rolling speed of the target device is less than the rolling speed threshold by one target speed value, the current rolling pressure of the target device is controlled to correspondingly increase by one third target pressure value.

In the present disclosure, the foregoing manner of adjusting the current rolling pressure or a current rolling temperature may be a direct adjustment. Alternatively, the third target pressure value may be calculated according to the obtained current rolling speed data by the fourth calculation formula loaded to the executing entity for executing the control method, and then the roller may be adjusted automatically according to the third target pressure value by the executing entity for executing the control method.

That is, in an embodiment, before the adjusting the current rolling pressure of the target device according to the current rolling speed data and a preset third pressure adjustment policy, the method further includes inputting the current rolling speed to a preset fourth calculation formula to perform calculation, and outputting the third target pressure value by the fourth calculation formula.

Specifically, the fourth calculation formula includes $Fc3 = \alpha^*(Speed1 - Speed2)$, in which $Fc3$ is the third target pressure value, $\alpha$ is a pressure adjustment coefficient, $Speed1$ is the preset rolling speed threshold, and $Speed2$ is the current rolling speed.

Illustratively, the pressure adjustment coefficient $\alpha$ may be any value ranging from 0.1-5 tons. Both the pressure adjustment coefficient $\alpha$ and the rolling speed threshold $Speed1$ may be set according to experience. Illustratively, it is set that, $\alpha=3$ and $Speed1=80$ (micrometers/second).

An embodiment is described with an example. When it is detected that the current rolling speed data of the target device is $Speed2=82$ (micrometer/second), 82 (micrometer/second) is input to the fourth calculation formula for calculation, and $Fc = \alpha^*(Speed1 - Speed2) = -6$, that is, the third target pressure value output by the fourth calculation formula is (−6) tons. It is indicated that the current rolling speed of the target device is greater than the rolling speed threshold by two target speed values, in which the target speed value is 3 (micrometer/second). The executing entity for executing the control method correspondingly controls the current rolling pressure of the target device to decrease by two third target pressure values, that is, controls the current rolling pressure of the target device to decrease by 6 tons. Alternatively, when it is detected that the current rolling speed data of the target device is Speed2=79 (micrometer/second), 79 (micrometer/second) is input to the fourth calculation formula for calculation, and Fc3=$\alpha$*(Speed1−Speed2)=3, that is, the third target pressure value output by the fourth calculation formula is (+3) tons, It is indicated that the current rolling speed of the target device is less than the rolling speed threshold by one target speed value. The executing entity for executing the control method correspondingly controls the current rolling pressure of the target device to increase by one third target pressure value, that is, controls the current rolling pressure of the target device to increase by 3 tons.

In an actual application process, the executing entity for executing the control method adaptively adjusts the current rolling pressure of the target device according to the current rolling speed of the target device. Using an example in which the to-be-rolled electrode is rolled by a roller driven by a cylinder, the parameter adjustment of the current rolling speed and the current rolling pressure of the target device may refer to Table 2.

TABLE 2

| Speed range (meter/minute) | Drive-side pressure (ton) | Operation-side pressure (ton) |
| --- | --- | --- |
| 0 to 5 | 8.70 | 8.82 |
| 5 to 10 | 8.65 | 8.77 |
| 10 to 15 | 8.20 | 8.32 |
| 15 to 25 | 8.10 | 8.22 |
| 25 to 50 | 8.10 | 8.22 |
| 50 to 75 | 8.10 | 8.22 |
| 75 to 100 | 8.42 | 8.54 |
| 100 to 125 | 8.45 | 8.57 |

In Table 2, the speed range indicates a speed range in which the current rolling speed of the target device is, the drive-side pressure indicates the current rolling pressure of the cylinder, and the operation-side pressure indicates the current rolling pressure of the roller. In an embodiment, the current rolling pressure adjusted by the executing entity for executing the control method may be the current rolling pressure of the cylinder, or may be the current rolling pressure of the roller, which is not specifically limited herein.

The following explains some data in Table 2. When the current rolling speed of the target device is 20 (meter/minute), it indicates that the current rolling speed of the target device is in a speed range of 15-25 (meter/minute). Correspondingly, the executing entity for executing the control method correspondingly adjusts the current rolling pressure of the cylinder to 8.10 tons, or adjusts the current rolling pressure of the roller to 8.10 tons.

Only an example is described herein. Because different device types have a difference, different parameters may be actually set according to different device types. The first target thickness value and the first target pressure value are not specifically limited herein. A manner of obtaining the fourth calculation formula is specifically described below in the present disclosure, which is not stated herein.

Manners of obtaining the first calculation formula, the second calculation formula, the third calculation formula, and the fourth calculation formula are specifically introduced below.

That is, in some embodiments of the present disclosure, the control method further includes obtaining first thickness change sampled data of the to-be-rolled electrode, second thickness change sampled data of the rolled electrode, and current rolling speed sampled data of the target device; performing data cleaning and data update on the first thickness change sampled data, the second thickness change sampled data, and the current rolling speed sampled data; and training a preset calculation model with the first thickness change sampled data, the second thickness change sampled data, and the current rolling speed sampled data on which the data cleaning and data update are performed as an input, and with the current rolling pressure or the current rolling temperature as an output, to obtain a trained calculation formula.

In an embodiment, the trained calculation formula includes any one of the first calculation formula, the second calculation formula, the third calculation formula, and the fourth calculation formula. It should be noted that, it is only necessary to select different calculation models according to different training requirements, and train the different calculation models according to training manners according to an embodiment, to finally obtain any one calculation model of the first calculation formula, the second calculation formula, the third calculation formula, and the fourth calculation formula through training.

In an embodiment, before training, first thickness change sampled data of multiple kinds of different to-be-rolled electrodes, second thickness change sampled data of multiple kinds of different rolled electrodes, and current rolling speed sampled data of the roller in different statuses are collected by the thickness detection device. After data labeling is completed, labeled data is used as training data of a to-be-trained model, and stored into a preset database configured to store sampled data.

In an embodiment, based on the first thickness change sampled data of the to-be-rolled electrode, the second thickness change sampled data of the rolled electrode, and the current rolling speed sampled data of the target device on which data cleansing and data update are performed, a linear formula, a neural network, a decision tree, or the like is used as a backbone network, and an algorithm such as linear regression, logistic regression, Lasso regression, Ridge regression, or an EM algorithm is used to train a calculation model, to finally obtain any one model of the first calculation formula, the second calculation formula, the third calculation formula, and the fourth calculation formula. Manners of training the foregoing calculation formulas are not specifically limited in the present embodiment.

In the present disclosure, the foregoing lithium battery electrode thickness control method is used to control the target device to roll the to-be-rolled electrode, so that the thickness status of the to-be-rolled electrode, the rolling status of the rolled electrode, and the current rolling speed, the current rolling pressure, and the current rolling temperature of the roller can be obtained in real time, and the current rolling pressure or the current rolling temperature of the target device can be adjusted according to the first thickness change data, the second thickness change data, or the current rolling speed data. It is proved experimentally that, before the rolling control method of the present disclosure is used, the thickness tolerance of the rolled electrode is ±4 micrometers. After the rolling control method of the present disclosure is used, the thickness tolerance of the rolled electrode increases to +1.5 micrometers and +1 micrometer. That is, in the present disclosure, by upgrading software algorithms without reconstructing the hardware device, thickness consistency of a semi-manufactured electrode increases to +1 micrometer, resolving a problem that the rolling thickness of the electrode is not uniform, so as to make the thickness of the rolled electrode obtained through rolling uniform.

Figure 7:
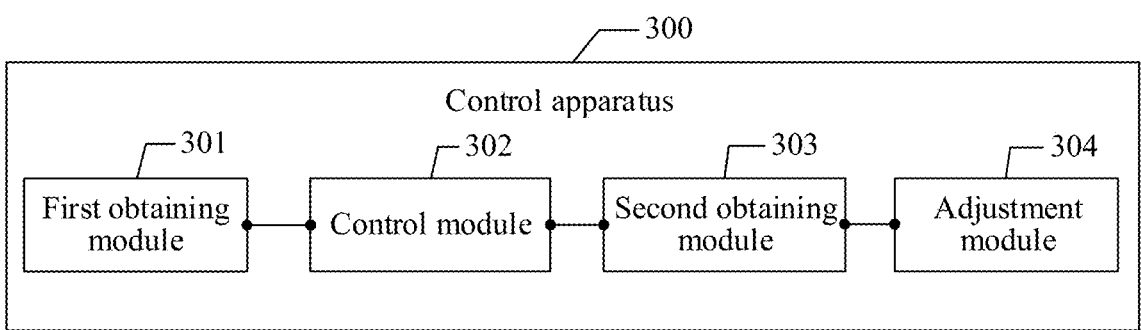
FIG. 7 is a schematic diagram of a structure according to some embodiments of a control apparatus according to some embodiments of the present disclosure.

To better implement the electrode thickness control method in the embodiments of the present disclosure, based on the electrode thickness control method, according to an embodiment of the present disclosure, a control apparatus, applied to a control system, includes a target device configured to roll a to-be-rolled electrode. As shown in FIG. 7, the control apparatus 300 includes a first obtaining module 301 configured to obtain an initial thickness and a target thickness of a to-be-rolled electrode; a control module 302, configured to control, according to the initial thickness and the target thickness, the target device to roll the to-be-rolled electrode, a second obtaining module 303 configured to obtain first thickness change data of the to-be-rolled electrode, second thickness change data of a rolled electrode formed through rolling, and current rolling speed data of the target device; and an adjustment module 304 configured to adjust a current rolling pressure or a current rolling temperature of the target device according to the first thickness change data, the second thickness change data, or the current rolling speed data, to cause a thickness of the rolled electrode to reach the target thickness.

Particularly, the adjustment module 304 is further configured to adjust the current rolling pressure of the target device according to the first thickness change data and a preset first pressure adjustment policy.

Particularly, the first pressure adjustment policy includes: each time the thickness of the to-be-rolled electrode increases by one first target thickness value, the current rolling pressure of the target device is controlled to correspondingly increase by one first target pressure value; or each time a thickness of the to-be-rolled electrode decreases by one first target thickness value, the current rolling pressure of the target device is controlled to correspondingly decrease by one first target pressure value.

Particularly, the adjustment module 304 is further configured to input the first target thickness value to a preset first calculation formula to perform calculation, and output the first target pressure value by the first calculation formula.

The first calculation formula includes: $Fc1 \propto Tc1$. $Fc1$ is the first target pressure value, and $Tc1$ is the first target thickness value.

The second thickness change data includes length and thickness change data of the rolled electrode in a first direction. The first direction is a direction in which the rolled electrode is transferred in the target device. Particularly, the adjustment module 304 is further configured to adjust the current rolling pressure of the target device according to the length and thickness change data and a preset second pressure adjustment policy.

Particularly, the second pressure adjustment policy includes: each time the thickness of the rolled electrode increases by one second target thickness value in the first direction, the current rolling pressure of the target device is controlled to correspondingly increase by one second target pressure value; or each time the thickness of the rolled electrode decreases by one second target thickness value in the first direction, the current rolling pressure of the target device is controlled to correspondingly decrease by one second target pressure value.

Particularly, the adjustment module 304 is further configured to input the second target thickness value to a preset second calculation formula to perform calculation, and output the second target pressure value by the second calculation formula.

The second calculation formula includes $Fc2 \propto Tc2$. $Fc2$ is the second target pressure value, and $Tc2$ is the second target thickness value.

The target device includes a roller. The roller includes multiple rolling regions arranged sequentially in a second direction. The current rolling temperature corresponding to each of the rolling regions is independently controlled. The second direction is an axial direction of the roller.

The rolled electrode includes multiple width regions arranged sequentially in the second direction. In a process of transferring the rolled electrode, one of the width regions corresponds to one rolling region. The second thickness change data includes multiple pieces of width and thickness change data corresponding to the multiple width regions.

Particularly, the adjustment module 304 is further configured to adjust the current rolling temperature of the multiple rolling regions of each roller according to the multiple pieces of width and thickness change data and a preset temperature adjustment policy.

Particularly, the temperature adjustment policy is set to include: each time a thickness of the width region of the rolled electrode increases by one third target thickness value, the current rolling temperatures of the rolling region of two rollers corresponding to the width region is controlled to correspondingly increase by one target temperature value; or each time a thickness of the width region of the rolled electrode decreases by one third target thickness value, the current rolling temperatures of the rolling region of the two rollers corresponding to the width region is controlled to correspondingly decrease by one target temperature value.

Particularly, the adjustment module 304 is further configured to input the third target thickness value to a preset third calculation formula to perform calculation, and output the target temperature value through the third calculation formula.

The third calculation formula includes $Tempc \propto Tc3$. $Tempc$ is the target temperature value, and $Tc3$ is the third target thickness value.

Particularly, the adjustment module 304 is further configured to adjust the current rolling pressure of the target device according to the current rolling speed data and a preset third pressure adjustment policy.

Particularly, the third pressure adjustment policy is set to include: each time a current rolling speed of the target device is greater than a preset rolling speed threshold by one target speed value, the current rolling pressure of the target device is controlled to correspondingly decrease by one third target pressure value; or each time a current rolling speed of the target device is less than the rolling speed threshold by one target speed value, the current rolling pressure of the target device is controlled to correspondingly increase by one third target pressure value.

Particularly, the adjustment module 304 is further configured to input the target speed value to a preset fourth calculation formula to perform calculation, and output the third target pressure value by the fourth calculation formula.

The fourth calculation formula includes: $Fc3 = \alpha * (Speed1 - Speed2)$. $Fc3$ is the third target pressure value, $\alpha$ is a pressure adjustment coefficient, $Speed1$ is the preset rolling speed threshold, and $Speed2$ is the current rolling speed.

According to some embodiments of the present disclosure, a control system includes a target device and a control apparatus. The control apparatus is electrically connected to the target device, and the control apparatus is configured to execute the foregoing electrode thickness control method.

In an embodiment, the control system may be a Programmable Logic Controller (PLC) and a Manufacturing Execution System (MES). The foregoing first calculation formula, second calculation formula, third calculation formula, and fourth calculation formula are loaded to the PLC and the MES. A cylinder is used to control the current rolling pressure or the current rolling temperature of the target device, and a rolling calculation formula is used to dynamically adjust the pressure of the cylinder, thereby resolving a problem that the thickness of the rolled electrode fluctuates greatly due to non-uniformity of the incoming material thickness.

In the present disclosure, by obtaining an initial thickness and a target thickness of a to-be-rolled electrode; controlling, according to the initial thickness and the target thickness, a target device to roll the to-be-rolled electrode; obtaining first thickness change data of the to-be-rolled electrode, second thickness change data of a rolled electrode formed through rolling, and current rolling speed data of the target devices; and adjusting a current rolling pressure or a current rolling temperature of the target devices according to the first thickness change data, the second thickness change data, or the current rolling speed data, a thickness status of the to-be-rolled electrode, a rolling status of the rolled electrode, and a current rolling speed, a current rolling pressure, and a current rolling temperature of rollers can be obtained in real time, and the current rolling pressure or the current rolling temperature can be adjusted in real time according to the data obtained in the rolling process, to cause a thickness of the rolled electrode to reach the target thickness, making it convenient to continuously keep the thickness of the rolled electrode obtained through rolling uniform.

What is claimed is:

1. An electrode thickness control method, comprising:
obtaining an initial thickness and a target thickness of a to-be-rolled electrode;
controlling, according to the initial thickness and the target thickness, a target device to roll the to-be-rolled electrode;
obtaining first thickness change data of the to-be-rolled electrode, second thickness change data of a rolled electrode formed through rolling, and current rolling speed data of the target device; and
adjusting, according to the first thickness change data, the second thickness change data, or the current rolling speed data, a current rolling pressure or a current rolling temperature of the target device, to cause a thickness of the rolled electrode to reach the target thickness;
wherein the adjusting, according to the first thickness change data, the second thickness change data, or the current rolling speed data, the current rolling pressure or the current rolling temperature of the target device comprises:
adjusting the current rolling pressure of the target device according to the current rolling speed data and a preset third pressure adjustment policy,
the third pressure adjustment policy comprises:
each time a current rolling speed of the target device is greater than a preset rolling speed threshold by one target speed value, the current rolling pressure of the target device is controlled to correspondingly decrease by one third target pressure value; or each time a current rolling speed of the target device is less than the rolling speed threshold by one target speed value, the current rolling pressure of the target device is controlled to correspondingly increase by one third target pressure value.

2. The control method according to claim 1, wherein the adjusting, according to the first thickness change data, the second thickness change data, or the current rolling speed data, the current rolling pressure or the current rolling temperature of the target device comprises:
adjusting the current rolling pressure of the target device according to the first thickness change data and a preset first pressure adjustment policy;
the first pressure adjustment policy comprises:
each time a thickness of the to-be-rolled electrode increases by one first target thickness value, the current rolling pressure of the target device is controlled to correspondingly increase by one first target pressure value; or each time a thickness of the to-be-rolled electrode decreases by one first target thickness value, the current rolling pressure of the target device is controlled to correspondingly decrease by one first target pressure value.

3. The control method according to claim 2, wherein before the adjusting the current rolling pressure of the target device according to the first thickness change data and the preset first pressure adjustment policy, the method further comprises:
inputting the first target thickness value to a preset first calculation formula to perform calculation, and outputting the first target pressure value by the first calculation formula,
the first calculation formula comprises: $Fc1 \propto Tc1$, wherein $Fc1$ is the first target pressure value, and $Tc1$ is the first target thickness value.

4. The control method according to claim 2, wherein the second thickness change data comprises length and thickness change data of the rolled electrode in a first direction, and the first direction is a direction in which the rolled electrode is transferred in the target device;
the adjusting, according to the first thickness change data, the second thickness change data, or the current rolling speed data, the current rolling pressure or the current rolling temperature of the target device comprises:
adjusting the current rolling pressure of the target device according to the length and thickness change data and a preset second pressure adjustment policy;
the second pressure adjustment policy comprises:
each time the thickness of the rolled electrode increases by one second target thickness value in the first direction, the current rolling pressure of the target device is controlled to correspondingly increase by one second target pressure value; or each time the thickness of the rolled electrode decreases by one second target thickness value in the first direction, the current rolling pressure of the target device is controlled to correspondingly decrease by one second target pressure value.

5. The control method according to claim 4, wherein before the adjusting the current rolling pressure of the target device according to the length and thickness change data and the preset second pressure adjustment policy, the method further comprises:
inputting the second target thickness value to a preset second calculation formula to perform calculation, and outputting the second target pressure value by the second calculation formula, the second calculation formula comprises: Fc2∝Tc2, wherein Fc2 is the second target pressure value, and Tc2 is the second target thickness value.

6. The control method according to claim 4, wherein the target device comprises a roller, the roller comprises a plurality of rolling regions arranged sequentially in a second direction, the current rolling temperature corresponding to each of the rolling regions is independently controlled, and the second direction is an axial direction of the roller, the rolled electrode comprises a plurality of width regions arranged sequentially in the second direction, and in a process of transferring the rolled electrode, one of the width regions corresponds to one of the rolling regions, and the second thickness change data comprises a plurality of pieces of width and thickness change data corresponding to the plurality of width regions; and the adjusting, according to the first thickness change data, the second thickness change data, or the current rolling speed data, the current rolling pressure or the current rolling temperature of the two target devices comprises:

adjusting current rolling temperature of the plurality of rolling regions of each roller according to the plurality of pieces of width and thickness change data and a preset temperature adjustment policy, the temperature adjustment policy comprises:

each time a thickness of the width region of the rolled electrode increases by one third target thickness value, current rolling temperatures of rolling regions of the two rollers corresponding to the width region are controlled to correspondingly increase by one target temperature value; or each time a thickness of the width region of the rolled electrode decreases by one third target thickness value, the current rolling temperatures of the rolling regions of the two rollers corresponding to the width region are controlled to correspondingly decrease by one target temperature value.

7. The control method according to claim 6, wherein before the adjusting the current rolling temperature of the plurality of rolling regions of each of the rollers according to the plurality of pieces of width and thickness change data and the preset temperature adjustment policy, the method further comprises:

inputting the third target thickness value to a preset third calculation formula to perform calculation, and outputting the target temperature value by the third calculation formula, the third calculation formula comprises: Tempc∝Tc3, wherein Tempc is the target temperature value, and Tc3 is the third target thickness value.

8. The control method according to claim 1, wherein before the adjusting the current rolling pressure of the target device according to the current rolling speed data and the preset third pressure adjustment policy, the method further comprises:

inputting the current rolling speed to a preset fourth calculation formula to perform calculation, and outputting the third target pressure value through the fourth calculation formula, the fourth calculation formula comprises: Fc3=α* (Speed1−Speed2), wherein Fc3 is the third target pressure value, a is a pressure adjustment coefficient, Speed1 is the preset rolling speed threshold, and Speed2 is the current rolling speed.

9. A control system, comprising target device and a control apparatus, wherein the control apparatus is electrically connected to the target device, and the control apparatus is configured to execute an electrode thickness control method, the electrode thickness control method comprises:

obtaining an initial thickness and a target thickness of a to-be-rolled electrode;

controlling, according to the initial thickness and the target thickness, the target device to roll the to-be-rolled electrode;

obtaining first thickness change data of the to-be-rolled electrode, second thickness change data of a rolled electrode formed through rolling, and current rolling speed data of the target device; and adjusting, according to the first thickness change data, the second thickness change data, or the current rolling speed data, a current rolling pressure or a current rolling temperature of the target device, to cause a thickness of the rolled electrode to reach the target thickness;

wherein the adjusting, according to the first thickness change data, the second thickness change data, or the current rolling speed data, the current rolling pressure or the current rolling temperature of the target device comprises:

adjusting the current rolling pressure of the target device according to the current rolling speed data and a preset third pressure adjustment policy, the third pressure adjustment policy comprises:

each time a current rolling speed of the target device is greater than a preset rolling speed threshold by one target speed value, the current rolling pressure of the target device is controlled to correspondingly decrease by one third target pressure value; or each time a current rolling speed of the target device is less than the rolling speed threshold by one target speed value, the current rolling pressure of the target device is controlled to correspondingly increase by one third target pressure value.

10. The control system according to claim 9, wherein the adjusting, according to the first thickness change data, the second thickness change data, or the current rolling speed data, the current rolling pressure or the current rolling temperature of the target device comprises:

adjusting the current rolling pressure of the target device according to the first thickness change data and a preset first pressure adjustment policy, the first pressure adjustment policy comprises:

each time a thickness of the to-be-rolled electrode increases by one first target thickness value, the current rolling pressure of the target device is controlled to correspondingly increase by one first target pressure value; or each time a thickness of the to-be-rolled electrode decreases by one first target thickness value, the current rolling pressure of the target device is controlled to correspondingly decrease by one first target pressure value.

11. The control system according to claim 10, wherein the second thickness change data comprises length and thickness change data of the rolled electrode in a first direction, and the first direction is a direction in which the rolled electrode is transferred in the target device, the adjusting, according to the first thickness change data, the second thickness change data, or the current rolling speed data, the current rolling pressure or the current rolling temperature of the target device comprises:

adjusting the current rolling pressure of the target device according to the length and thickness change data and a preset second pressure adjustment policy, the second pressure adjustment policy comprises:

each time the thickness of the rolled electrode increases by one second target thickness value in the first direction, the current rolling pressure of the target device is controlled to correspondingly increase by one second target pressure value; or each time the thickness of the rolled electrode decreases by one second target thickness value in the first direction, the current rolling pressure of the target device is controlled to correspondingly decrease by one second target pressure value.

12. The control system according to claim 11, wherein the target device comprises a roller, the roller comprises a plurality of rolling regions arranged sequentially in a second direction, the current rolling temperature corresponding to each of the rolling regions is independently controlled, and the second direction is an axial direction of the roller;

the rolled electrode comprises a plurality of width regions arranged sequentially in the second direction, and in a process of transferring the rolled electrode, one of the width regions corresponds to one of the rolling regions, and the second thickness change data comprises a plurality of pieces of width and thickness change data corresponding to the plurality of width regions;

the adjusting, according to the first thickness change data, the second thickness change data, or the current rolling speed data, the current rolling pressure or the current rolling temperature of the two target devices comprises:

adjusting current rolling temperature of the plurality of rolling regions of each roller according to the plurality of pieces of width and thickness change data and a preset temperature adjustment policy; and the temperature adjustment policy comprises:

each time a thickness of the width region of the rolled electrode increases by one third target thickness value, current rolling temperatures of rolling regions of the two rollers corresponding to the width region are controlled to correspondingly increase by one target temperature value; or each time a thickness of the width region of the rolled electrode decreases by one third target thickness value, the current rolling temperatures of the rolling regions of the two rollers corresponding to the width region are controlled to correspondingly decrease by one target temperature value.

* * * * *